(12) United States Patent
Sato et al.

(10) Patent No.: US 7,476,080 B2
(45) Date of Patent: Jan. 13, 2009

(54) IMPELLER FOR FLUID TRANSMITTING DEVICE AND METHOD OF MANUFACTURING THE SAME

(75) Inventors: Naoto Sato, Hamamatsu (JP); Tomohiko Tsuchiya, Hamamatsu (JP); Toshihide Kiriyama, Hamamatsu (JP); Syouji Takano, Hamamatsu (JP); Katsuyoshi Aoshima, Hamamatsu (JP); Naomi Takagi, Hamamatsu (JP)

(73) Assignee: Yutaka Giken Co., Ltd., Shizuoka (JP)

( * ) Notice: Subject to any disclaimer, the term of this patent is extended or adjusted under 35 U.S.C. 154(b) by 476 days.

(21) Appl. No.: 11/184,067

(22) Filed: Jul. 19, 2005

(65) Prior Publication Data

US 2006/0021220 A1    Feb. 2, 2006

(30) Foreign Application Priority Data

Jul. 26, 2004    (JP) .............................. 2004-216927
Jul. 26, 2004    (JP) .............................. 2004-216928

(51) Int. Cl.
*F01D 5/04*    (2006.01)
(52) U.S. Cl. ................ 416/180; 416/197 C; 416/213 A; 29/525.14; 29/889.5; 228/175
(58) Field of Classification Search ................. 416/180, 416/197 C, 213 R, 213 A; 29/525.13, 525, 29/14, 889.21, 889.22, 889.5; 228/175
See application file for complete search history.

(56) References Cited

U.S. PATENT DOCUMENTS

| | | | | |
|---|---|---|---|---|
| 3,869,258 A | * | 3/1975 | Scott | 29/889.5 |
| 6,123,505 A | * | 9/2000 | Sasse et al. | 416/197 C |
| 6,406,262 B1 | * | 6/2002 | Kundermann | 416/180 |
| 6,428,276 B1 | * | 8/2002 | Chasseguet et al. | 416/180 |
| 2004/0001756 A1 | * | 1/2004 | Takabayashi | 416/180 |
| 2004/0094380 A1 | | 5/2004 | Sasse | |

FOREIGN PATENT DOCUMENTS

| | | |
|---|---|---|
| JP | 2001-108059 A1 | 4/2001 |
| JP | 2003-214523 A1 | 7/2003 |
| JP | 2003-336719 A * | 11/2003 |

* cited by examiner

*Primary Examiner*—Christopher Verdier
(74) *Attorney, Agent, or Firm*—Arent Fox LLP (57) ABSTRACT

An impeller for a fluid transmitting device includes a hub and a bowl-shaped shell connected to an outer peripheral portion of the hub via an annular weld seam. An inner peripheral surface of the shell is fitted to an outer peripheral surface of the hub, and the weld seam is formed therebetween by laser welding over an entire length of fitting depth. Thus, it is possible to form the annular weld seam between the hub and the shell with a relatively small amount of heat input, and to precisely perform a visual inspection as to whether the weld seam is good or not without any skill.

5 Claims, 9 Drawing Sheets

IMPELLER FOR FLUID TRANSMITTING DEVICE AND METHOD OF MANUFACTURING THE SAME

RELATED APPLICATION DATA

The Japanese priority application Nos. 2004-216927 and 2004-216928 upon which the present application is based are hereby incorporated in their entirety herein by reference.

BACKGROUND OF THE INVENTION

1. Field of the Invention

The present invention relates to an impeller for a fluid transmitting device, such as a pump impeller and a turbine impeller, comprising: a hub; a bowl-shaped shell connected to an outer peripheral portion of the hub via an annular weld seam; and a plurality of blades rising from an inner peripheral surface of the shell.

2. Description of the Related Art

Such an impeller for a fluid transmitting device is known from, for example, Japanese Patent Application Laid-open No. 2001-108059.

In such a conventional impeller for a fluid transmitting device, MIG welding and TIG welding are widely performed to weld a hub to a shell. However, MIG welding requires a process for removing spatter produced from a work in the welding; and both MIG and TIG welding requires a large amount of heat input for welding the entire periphery of the hub and the shell, so that thermal distortion is often generated in the work, and in this case, a distortion removing process is required. Further, a skill is required for visual inspection as to whether the weld seam is good or not.

Also, Japanese Patent Application Laid-open No. 2003-214523 discloses a method of manufacturing an impeller for a fluid transmitting device in which plural blades are annularly arranged on an inner surface of a bowl-shaped shell; an annular retainer plate for retaining radially inner ends of the blades is temporarily fixed by welding on the inner surface of the shell; after the temporary fixation, the blades and retainer plate are brazed to the inner surface of the shell; and after the brazing, a hub is welded to the central portion of the shell.

However, in the conventional method of manufacturing an impeller for a fluid transmitting device, spot welding or projection welding is typically performed to temporally fix the retainer plate on the inner surface of the shell. In either welding, the shell and the retainer plate are required to be strongly pressed to each other, and the resultant pressure may cause distortion in the shell and the retainer plate. Particularly in the projection welding, deformation of a protrusion which is formed on one of opposed surfaces of the shell and the retainer plate, is likely to spread to the surrounding to cause distortion there.

SUMMARY OF THE INVENTION

The present invention has been achieved in view of the above-mentioned circumstances, and has an object to provide an impeller for a fluid transmitting device with good quality and productivity, which enables an annular weld seam to be formed with a relatively small amount of heat input and which enables a precise visual inspection as to whether the weld seam is good or not without any skill.

Also, the present invention has another object to provide a method of manufacturing an impeller for a fluid transmitting device, in which a retainer plate can be temporarily fixed to a shell by welding with ease without causing distortion in the shell and the retainer plate.

In order to achieve the above-mentioned objects, according to a first feature of the present invention, there is provided an impeller for a fluid transmitting device, comprising: a hub; a bowl-shaped shell connected to an outer peripheral portion of the hub via an annular weld seam; and a plurality of blades rising from an inner peripheral surface of the shell, wherein the inner peripheral surface of the shell is fitted to an outer peripheral surface of the hub, and the weld seam is formed therebetween by laser welding over an entire length of fitting depth.

Also, according to a second feature of the present invention, there is provided an impeller for a fluid transmitting device, comprising: a hub; a bowl-shaped shell connected to an outer peripheral portion of the hub via an annular weld seam; and a plurality of blades rising from an inner peripheral surface of the shell, wherein an inner peripheral surface of a cylindrical boss formed at an inner peripheral end of the shell is fitted to an outer peripheral surface of the hub, and the weld seam is formed therebetween by laser welding over an entire length of fitting depth.

With the first and second features of the present invention, the annular weld seam can be formed with a relatively small amount of heat input by laser welding, and the hub can liquid-tightly and firmly be bonded to a shell while avoiding thermal distortion in the shell. Further, the laser welding does not cause any spatter so that a step for removing the spatter is not required. Therefore, the invention greatly contributes to an improvement of the quality and productivity of a pump impeller.

In addition, because the weld seam is formed to extend from one axial end to the other end of the fitted portion of the shell and the hub, creating an annular discolored portion on the other end of the fitted portion, anyone can easily and reliably determine whether the weld seam by the laser welding is good or not only by a visual inspection as to the presence or absence of the discolored portion, thereby contributing to a guarantee of high quality.

Further, with the second feature of the present invention, the boss of the shell extends to secure a sufficient fitting depth with respect to the hub, so that even if the shell is relatively thin, the depth of the weld seam can be secured large enough. Therefore, it is possible to effectively enhance the bonding strength between the shell and the hub by the annular weld seam provided by the laser welding.

According to a third feature of the present invention, there is provided a method of manufacturing an impeller for a fluid transmitting device, comprising the steps of: arranging annularly a plurality of blades on an inner surface of a bowl-shaped shell; fixing temporarily by welding an annular retainer plate on the inner surface of the shell to retain radially inner ends of the blades; brazing the blades and the retainer plate to the inner surface of the shell; and welding a hub to a central portion of the shell, wherein the welding is performed by superposing the retainer plate on the inner surface of the shell, and forming a weld seam between the retainer plate and the shell by applying a laser beam from the side of the retainer plate.

With the third feature of the present invention, when the weld seam is formed by the laser welding between the shell and the retainer plate to temporarily fix the retainer plate to the shell, flat opposed surfaces of the shell and the retainer plate are only overlapped without strongly pressing them to each other as in the conventional spot welding or projection welding. Therefore, it is possible to facilitate welding operation, and further avoid distortion in the shell and the retainer plate, thereby contributing to an improvement of the quality and productivity of an impeller.

According to a fourth feature of the present invention, in Addition to the third feature, the weld seam is annularly formed to surround the hub, and the blades and the retainer plate are brazed to the inner surface of the shell at a position radially outward of the weld seam.

With the fourth feature of the present invention, when the blades and the retainer plate are brazed to the shell, the leakage of molten brazing material onto an inner peripheral surface of the shell can be blocked by the annular weld seam for temporary fixation, thereby reliably preventing the brazing material from flowing out and mixing into the molten portion when the shell is welded to the hub after the brazing, thereby accomplishing good welding.

According to a fifth feature of the present invention, in addition to the third feature, a cylindrical boss protruding toward the retainer plate is formed at a peripherally inner end of the shell, and welded to the hub by the weld seam formed in spots.

With the fifth feature of the present invention, when the blades and the retainer plate are brazed to the shell, even if a molten brazing material passes between the shell and the retainer plate while circumventing the weld seam spots, the molten brazing material is blocked by an outer peripheral surface of the boss of the shell, and does not reach an inner peripheral surface of the boss. Therefore, the spot-arranged weld seam is sufficient to temporarily fix the retainer plate, thereby improving the efficiency of operation of the temporary fixation. In subsequent welding of the boss of the shell to the hub, it is possible to reliably prevent the brazing material from flowing out and mixing into the molten portion when the shell is welded to the hub after the brazing, thereby performing an excellent welding.

The fluid transmitting device corresponds to a torque converter T in an embodiment of the present invention which will be described below, and the impeller corresponds to a pump impeller 2 and a turbine impeller 3.

The above-mentioned object, other objects, characteristics, and advantages of the present invention will be become apparent from an explanation of a preferred embodiment, which will be described in detail below by reference to the attached drawings.

DESCRIPTION OF THE PREFERRED EMBODIMENT

A preferred embodiment of the invention will now be described based on the accompanying drawings.

Figure 1:
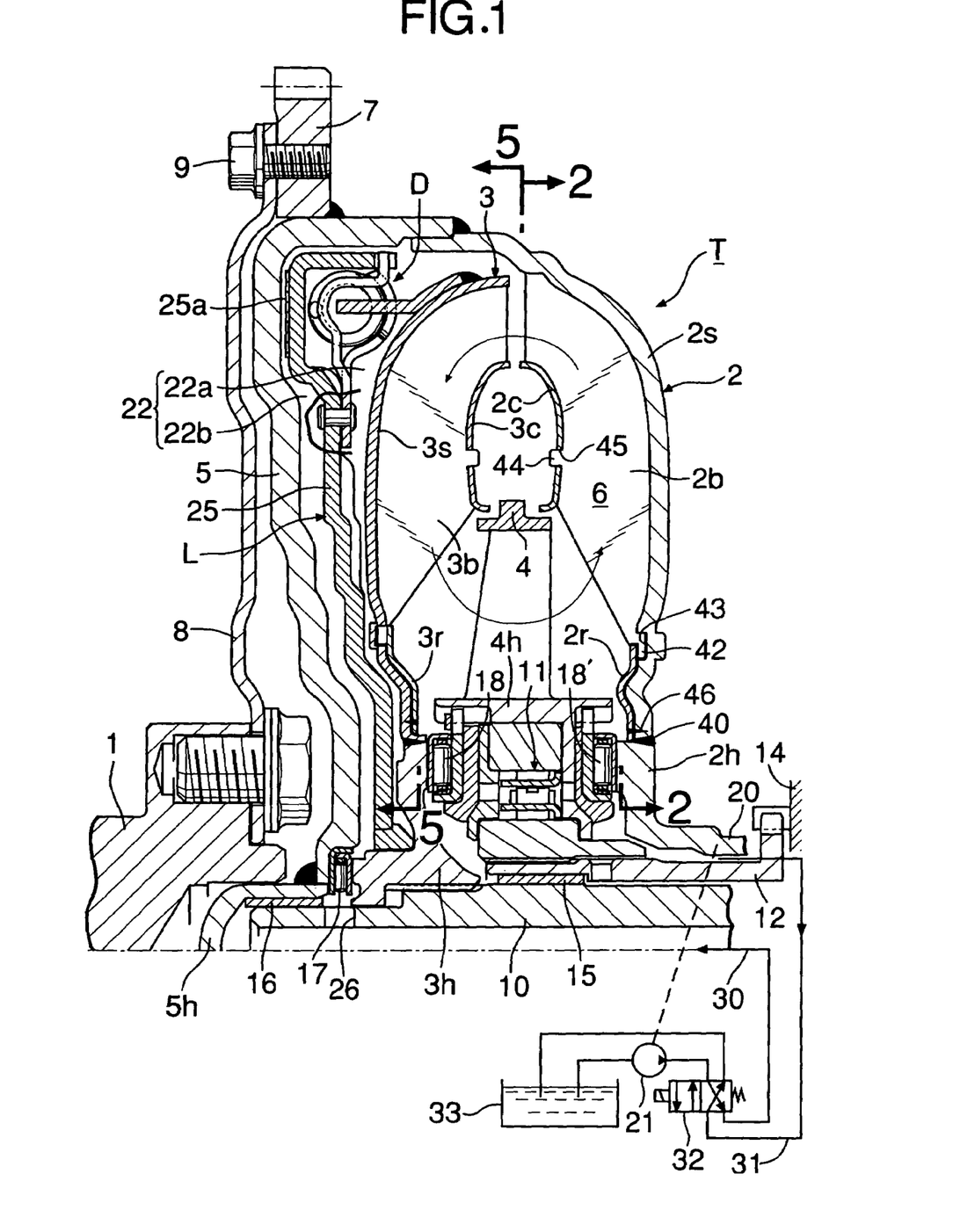
FIG. 1 is a side longitudinal sectional view of the top half of a torque converter according to an embodiment of the present invention.

Referring first to FIG. 1, a torque converter T as a fluid transmitting device includes a pump impeller 2, a turbine impeller 3 disposed to face the pump impeller 2, and a stator impeller 4 inserted between inner peripheral portions of the pump impeller 2 and the turbine impeller 3. A circulation circuit 6 for transmitting a power by a working oil is defined between these three impellers 2, 3 and 4.

A power transmission cover 5 is integrally connected to an outer peripheral portion of the pump impeller 2 by welding to cover an outer side of the turbine impeller 3. Starting ring gears 7 are welded to an outer peripheral surface of the power transmission cover 5. A drive plate 8 coupled to a crankshaft 1 on an engine is secured to the ring gears 7 by bolts 9. A thrust needle bearing 17 is interposed between a hub 3h of the turbine impeller 3 and the power transmission cover 5.

An output shaft 10 arranged coaxially with the crankshaft 1 is disposed at a central portion of the torque converter T. The output shaft 10 is spline-fitted to the hub 3h of the turbine impeller 3, and rotatably supported on an inner peripheral surface of a hub 5h of the power transmission cover 5 with a bearing bush 16 interposed therebetween. The output shaft 10 is a main shaft of a multi-stage transmission which is not shown.

A cylindrical stator shaft 12 is disposed around an outer periphery of the output shaft 10, and supports a hub 4h of the stator impeller 4 with a free wheel 11 interposed therebetween. A bearing bush 15 is interposed between the output shaft 10 and the stator shaft 12, to permit the relative rotation of the shafts 10 and 12. An outer end of the stator shaft 12 is non-rotatably supported at its outer end on a transmission case 14.

Thrust needle bearings 18 and 18' are interposed between the hub 4h of the stator impeller 4, and the hubs 2h and 3h of the pump impeller 2 and the turbine impeller 3.

An auxiliary-driving shaft 20 coupled to the hub 2h of the pump impeller 2 is relatively rotatably disposed around an outer periphery of the stator shaft 12, to drive an oil pump 21 for supplying the working oil to the torque converter T.

A clutch chamber 22 is defined between the turbine impeller 3 and the power transmission cover 5, to accommodate a lock-up clutch L capable of directly coupling the turbine impeller 3 and the power transmission cover 5 to each other. A clutch piston 25 forming a main member of the lock-up clutch L is disposed in the clutch chamber 22, to divide the clutch chamber 22 into an inner chamber 22a on the turbine impeller 3 side and an outer chamber 22b on the transmission cover 5 side. The clutch piston 25 has an annular friction lining 25a facing an inner surface of the transmission cover 5, on the side wall of its outer peripheral portion. The clutch piston 25 is slidably supported on an outer peripheral surface of the hub 3h of the turbine impeller 3 so as to axially move between a connected position where the friction lining 25a is pressed on the inner surface of the power transmission cover 5 and a disconnected position where the friction lining 25a is spaced apart from the inner wall.

A torque damper D is also disposed in the clutch chamber 22 to bufferingly connect together the clutch piston 25 and the turbine impeller 3.

A first oil passage 30 is provided at the central portion of the output shaft 10 to communicate with the outer chamber 22b of the clutch chamber 22 via a side aperture 26 and the thrust needle bearing 17. Also, a second oil passage 31 is defined between the auxiliary machine driving shaft 20 and the stator shaft 12 to communicate with an inner peripheral portion of the circulating circuit 6 via the thrust needle bearings 18, 18' and the free wheel 11. The first oil passage 30 and the second oil passage 31 are alternately connected, through a lock-up control valve 32, to a discharge side of the oil pump 21 and an oil sump 33.

Therefore, in an idling or extremely low operational state of the engine, the lock-up control valve 32 is controlled by an electronic control unit (not shown) so as to connect the first oil passage 30 to the discharge port of the oil pump 21, and on the other hand, to connect the second oil passage 31 to the oil sump 33. Therefore, a torque output from the crankshaft 1 of the engine is transmitted through the drive plate 8 and the power transmission cover 5 to the pump impeller 2 to rotate the pump impeller 2, and when the oil pump 21 is also driven, a working oil discharged by the oil pump 21 flows from the lock-up control valve 32 sequentially via the first oil passage 30, the transverse bore 26, the thrust needle bearing 17 and the outer and inner chamber 22b and 22a of the clutch chamber 22 into the circulation circuit 6 to fill the circuit 6, and thereafter flows via the thrust needle bearings 18 and 18' into the second oil passage 31, and returns through the lock-up control valve 32 to the oil sump 33.

On the other hand, in the clutch chamber 22, the pressure in the outer chamber 22b is higher than that in the inner chamber 22a in virtue of the flow of the working oil as described above, and the clutch piston 25 is retracted away from an inner wall of the power transmission cover 5 by a difference between the pressures in the outer and inner chamber 22b and 22a. Thus, the lock-up clutch L is in a turned-off state, to permit the relative rotation of the pump impeller 2 and the turbine impeller 3. Therefore, when the pump impeller 2 is rotatingly driven from the crankshaft 1, the working oil filling the circulation circuit 6 is circulated in the circulation circuit 6 as shown by an arrow, whereby the rotational torque of the pump impeller 2 is transmitted to the turbine impeller 3 to drive the output shaft 10.

If amplification action of torque occurs between the pump impeller 2 and the turbine impeller 3 at this time, an accompanying reaction force is exerted on the stator impeller 4, so that the stator impeller 4 is fixed by a locking action of the free wheel 11.

When the torque converter T is in such a coupled state, the operation of the lock-up control valve 32 is changed by the electronic control unit. As a result, as opposed to the previous case, the working oil discharged from the oil pump 21 flows from the lock-up control valve 32 through the second oil passage 31 into the circulating circuit 6, fills the circuit 6, then flows to the inner chamber 22a of the clutch chamber 22, and also fills the inner chamber 22a. On the other hand, since the outer chamber 22b of the clutch chamber 22 is opened to the oil sump 33 via the first oil passage 30 and the lock-up control valve 32, the clutch chamber 22 has a pressure in the inner chamber 22a higher than that in the outer chamber 22b. The difference between these pressures presses the clutch piston 25 on the power transmission cover 5 side, and presses the friction lining 25a on the inner wall of the power transmission cover 5, so that the lock-up clutch L enters a connected state.

Then, the rotational torque transmitted from the crankshaft 1 to the pump impeller 2 is mechanically transmitted to the turbine impeller 3, so that the pump impeller 2 and the turbine impeller 3 enters a directly-coupled state, thereby efficiently transmitting the output torque of the crankshaft to the output shaft 10 to reduce fuel consumption.

Figure 2:
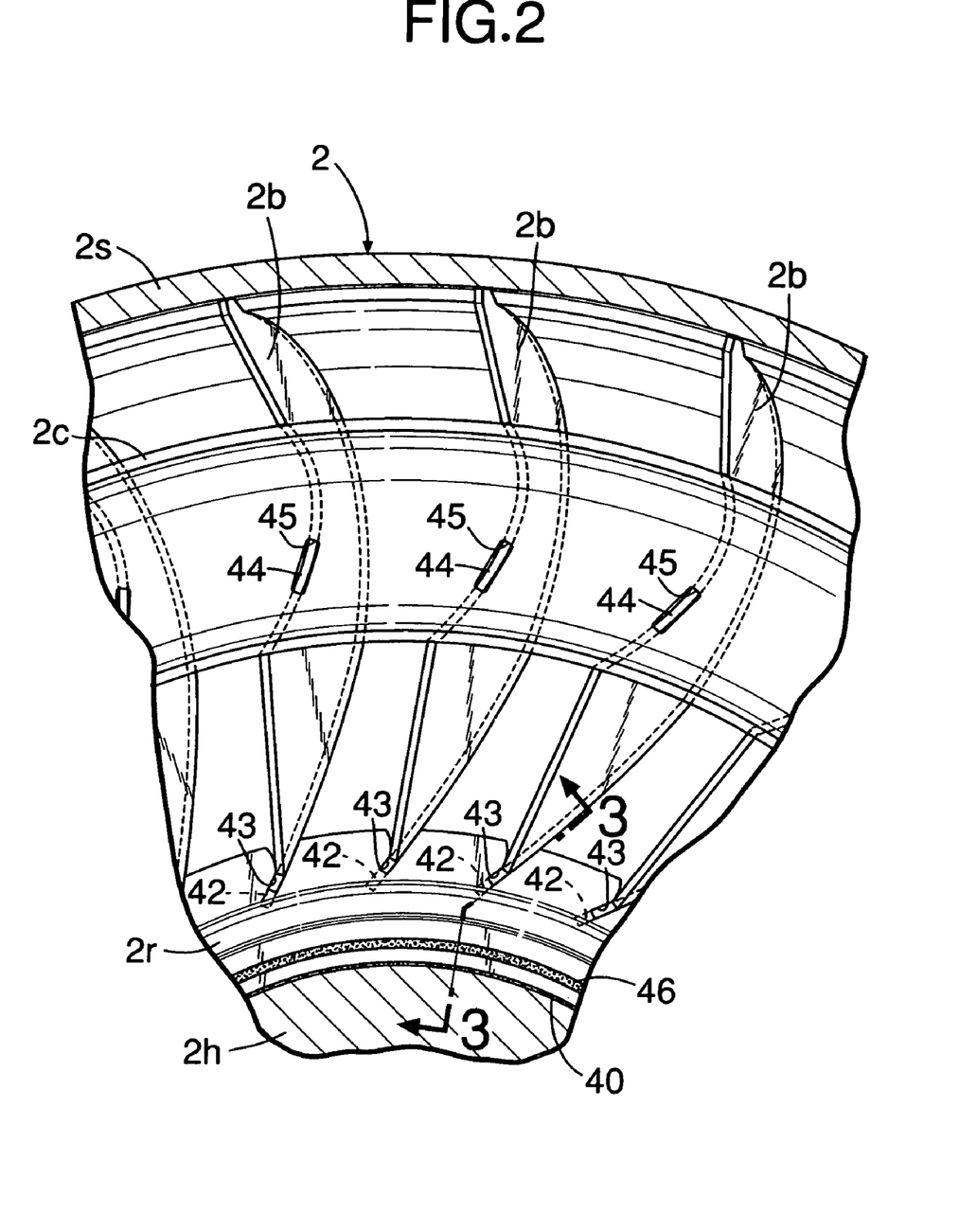
FIG. 2 is a sectional view taken on line 2-2 in FIG. 1.
Figure 3:
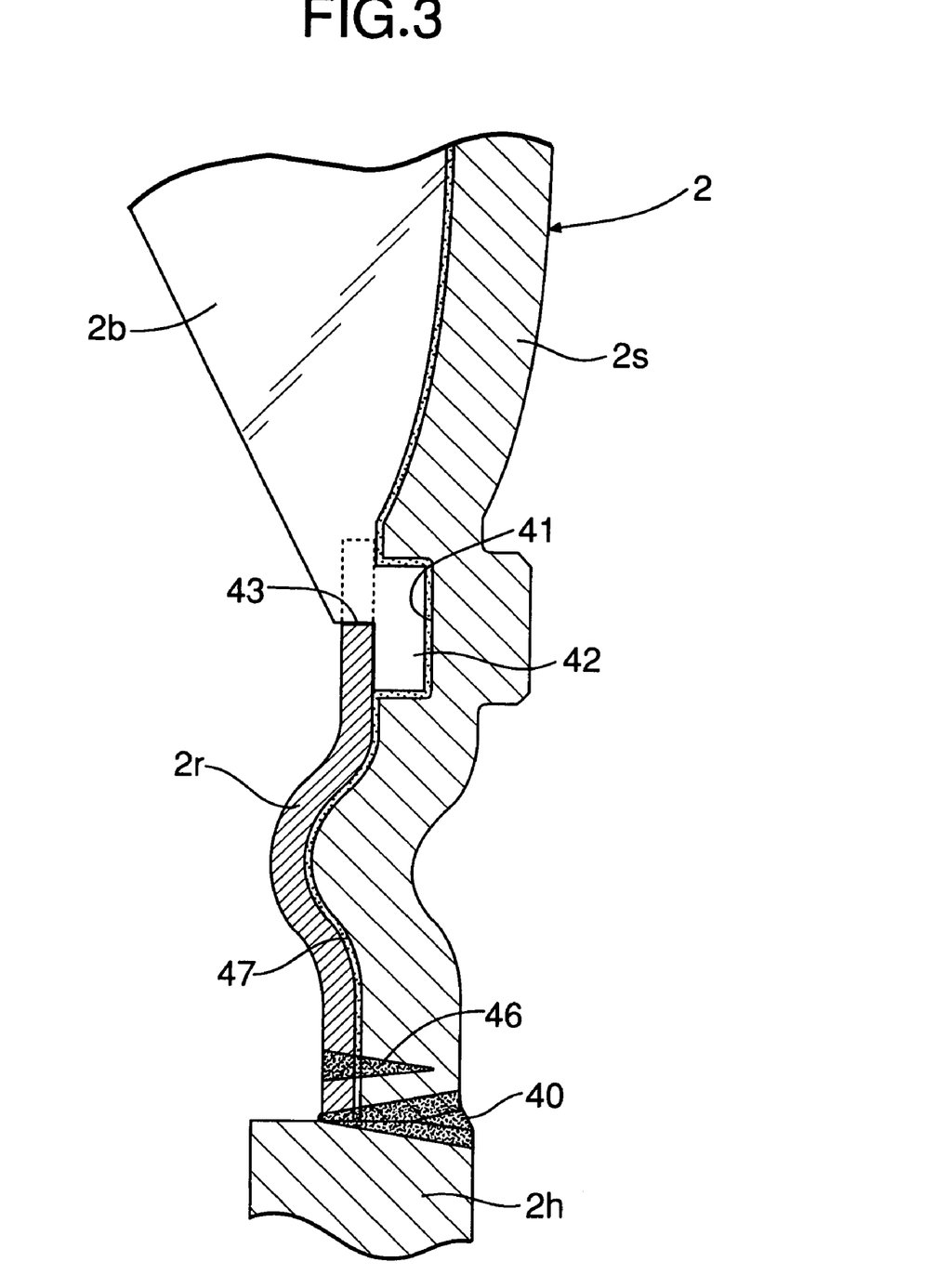
FIG. 3 is a sectional view taken on line 3-3 in FIG. 2.
Figure 4A:
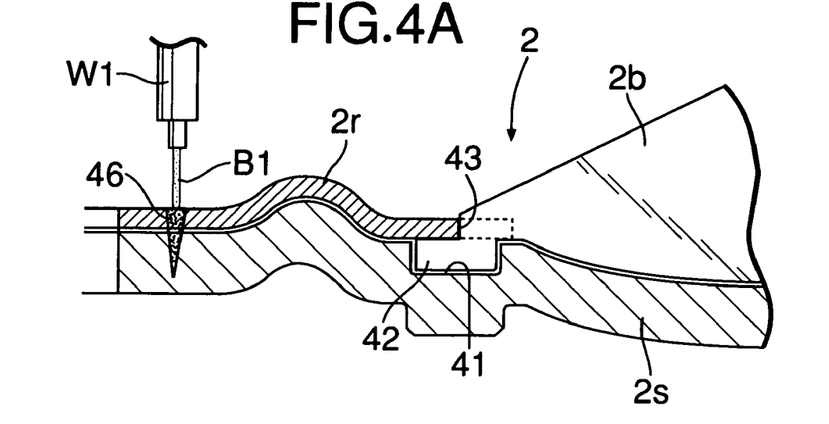
FIG. 4A illustrates a process of manufacturing a pump impeller, including formation of an annular weld seam.
Figure 4B:
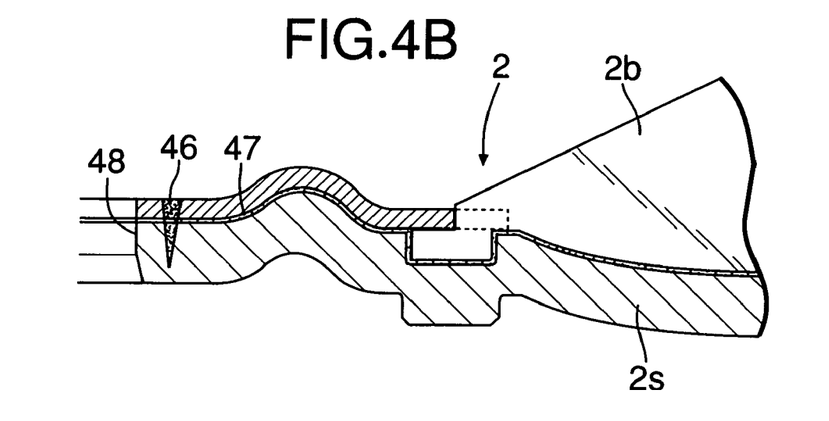
FIG. 4B illustrates a process of manufacturing a pump impeller, including infiltration of a molten brazing material.
Figure 4C:
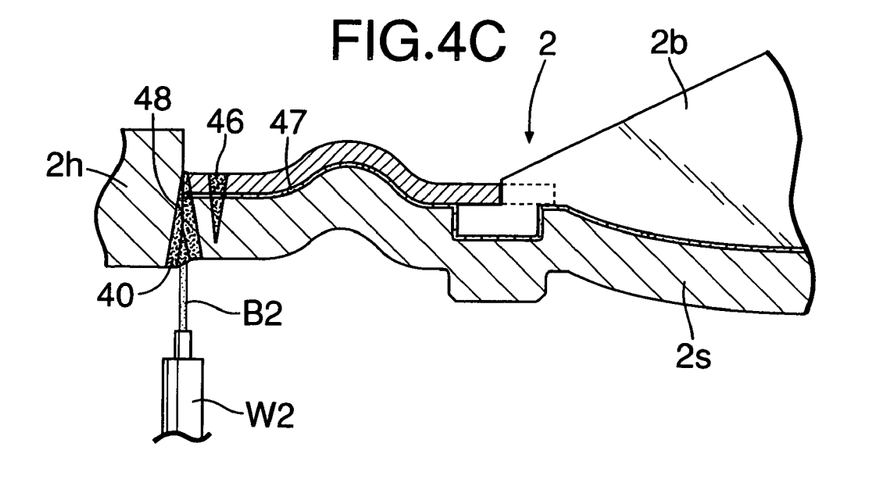
FIG. 4C illustrates a process of manufacturing, including formation of an annular weld seam.

Referring now to FIGS. 2 to 4, a construction of the pump impeller 2 and a method of manufacturing the same will be described.

The pump impeller 2 comprises: a bowl-shaped annular shell 2s; a large number of blades 2b brazed in place on an inner surface of the shell 2s; an annular retainer plate 2r brazed to an inner surface of the shell 2s to retain radially inner ends of the blades 2b; a core 2c connecting intermediate portions of all the blades 2b to each other; and a hub 2h fitted to inner peripheral surfaces of the shell 2s and the retainer plate 2r, and bonded to them through an annular weld seam 40 formed by laser welding.

On the shell 2s, there are formed a large number of peripherally-arranged positioning recesses 41, and each recess 41 is engaged with a positioning protrusion 42 formed on the radially inner end of each blade 2b.

On the other hand, the retainer plate 2r is disposed to press each positioning protrusion 42 of all the blades 2b toward the positioning recess 41 side at its outer periphery. The retainer plate 2r is also provided with positioning notches 43 with which each blade 2b is engaged.

On each blade 2b, there is formed a positioning protrusion 44 on an opposing edge to the core 2c, and a positioning hole 45 with which the positioning protrusion 44 is engaged is bored on the core 2c.

To braze the blades 2b and the retainer plate 2r to the shell 2s, the blades 2b and the retainer plate 2r are first set in place on the shell 2s as shown in FIG. 4A, and then while the shell 2s and the retainer plate 2r are rotated around their axe, a laser beam B1 is applied from a laser welding torch W1 onto the outer surface near the inner peripheral end of the retainer plate 2r, to form an annular weld seam 46 such that the weld seam melts and extend from the outer surface of the retainer plate 2r into the wall of the shell 2s to surround the hub 2h. The retainer plate 2r is temporarily fixed to the shell 2s by the weld seam 46.

After the temporary fixation, on the outer peripheral side of the annular weld seam 46, as shown in FIG. 4B, a molten brazing material 47 is infiltrated between the shell 2s, and the blades 2b, as well as the retainer plate 2r to perform brazing. The blades 2b are thus firmly bonded to the shell 2s along with the retainer plate 2r. At this time, the leakage of molten brazing material 47 onto inner peripheral ends of the shell 2s and the retainer plate 2r can reliably be blocked by the annular weld seam 46.

In forming the weld seam 46 by laser welding, flat opposing surfaces of the shell 2s and the retainer plate 2r are only overlapped without strongly pressing them to each other as in the conventional spot welding or projection welding. Therefore, it is possible to facilitate welding operation, and further avoid distortion in the shell and the retainer plate. Further, because each weld seam 46 begins at the retainer plate 3r and terminates within the wall of the shell 3, welding traces do not appear on the outer surface of the shell 3s, thereby provide a good appearance.

After the brazing, inner peripheral surfaces of the retainer plate 2r and the shell 2s are simultaneously drilled to form a fitting hole 48 which fits to an outer peripheral surface of the hub 2h. The outer peripheral surface of the hub 2h is fitted to the fitting hole 48, and while the shell 2s, the retainer plate 2r and the hub 2h are rotated around their axe, a laser beam B2 is applied by a laser welding torch W2 from the outside of the shell 2s toward a fitted portion of the shell 2s and the retainer plate 2r to the hub 2h, thereby forming an annular weld seam 40 such that the weld seam 40 melt and extend from one axial end to the other end of the fitted portion, as shown in FIG. 4C. Therefore, the annular weld seam 40 is formed over the entire length of the fitting depth in the fitted portion, thereby liquid-tightly and firmly bonding the shell 2s and the retainer plate 2r to the hub 2h.

As described above, because the brazing material 47 bonding the blades 2b and the retainer plate 2r to the shell 2s is prevented from leaking to the fitting hole 48 side by the annular weld seam 46 for temporary fixation, it is possible to reliably prevent the brazing material 47 from flowing out and mixing into the molten portion and mixing when the fitted portion is laser-welded. Therefore, a good weld seam 40 is formed to enhance the bonding strength between the shell 2s/retainer plate 2r and the hub 2h.

By using the laser welding, the annular weld seams 40, 46 can be formed with a relatively small amount of heat input to avoid thermal distortion in the shell 2s, and a process for removing the spatter is not required because the spatter does not occur. Therefore, the invention can greatly contribute to an improvement of the quality and productivity of the pump impeller 2.

In addition, because the annular weld seam 40 is formed such that the weld seam 40 is melted by the laser beam B2 and extends from one axial end to the other end of the fitted portion of the shell 2s and the retainer plate 2r to the hub 2h, an annular discolored portion is created on the other end of the fitted portion, that is, an outer surface of the retainer plate 2r. Thus, anyone can easily and reliably determine whether the laser weld is good or not only by a visual inspection as to the presence or absence of the discolored portion, thereby contributing to a guarantee of high quality.

Figure 8:
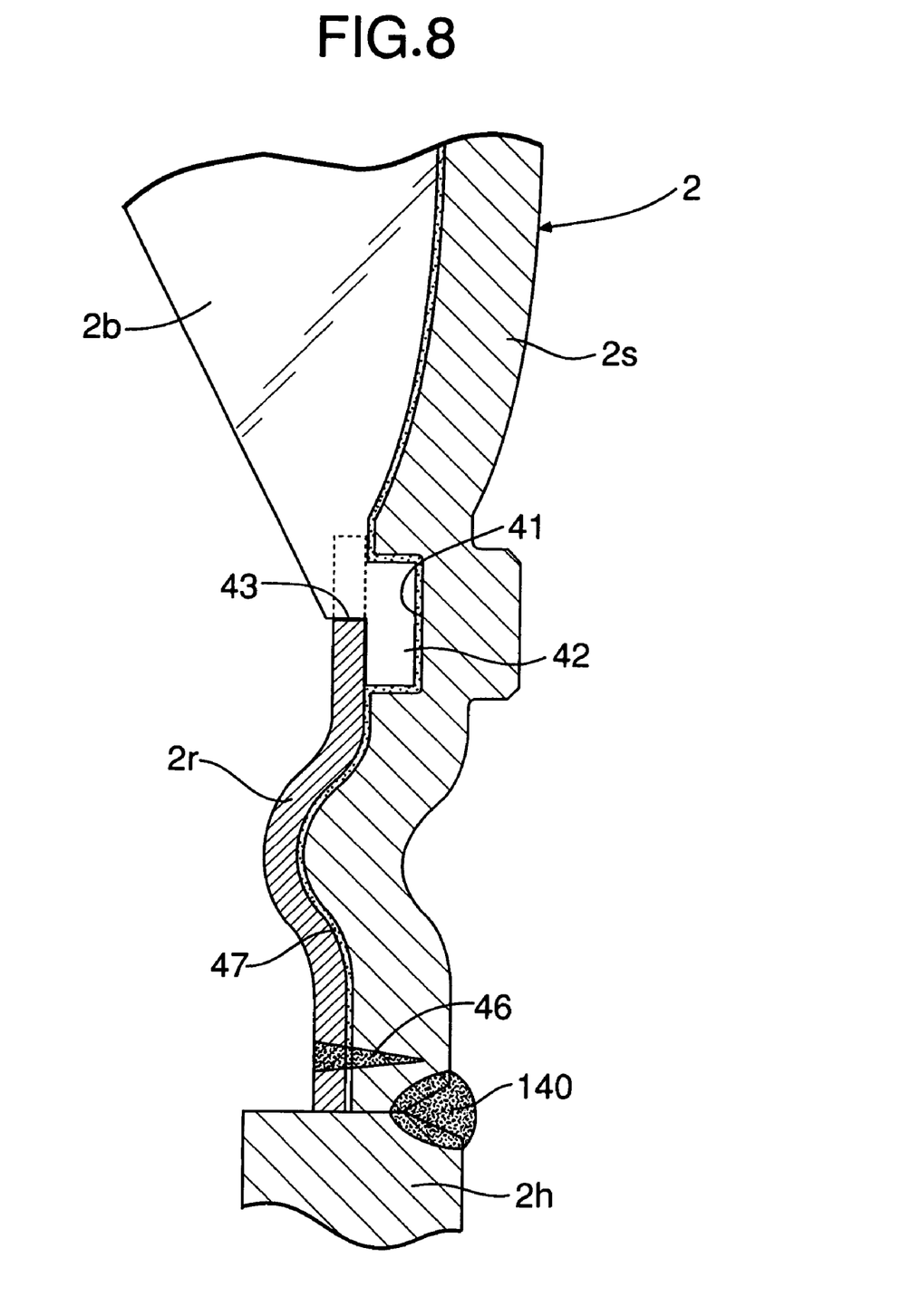
FIG. 8 illustrates a modification of the pump impeller, corresponding to FIG. 3.

To bond together the shell 2s and the hub 2h, an annular weld seam 140 may be formed by TIG or MIG welding, as shown in FIG. 8.

Figure 5:
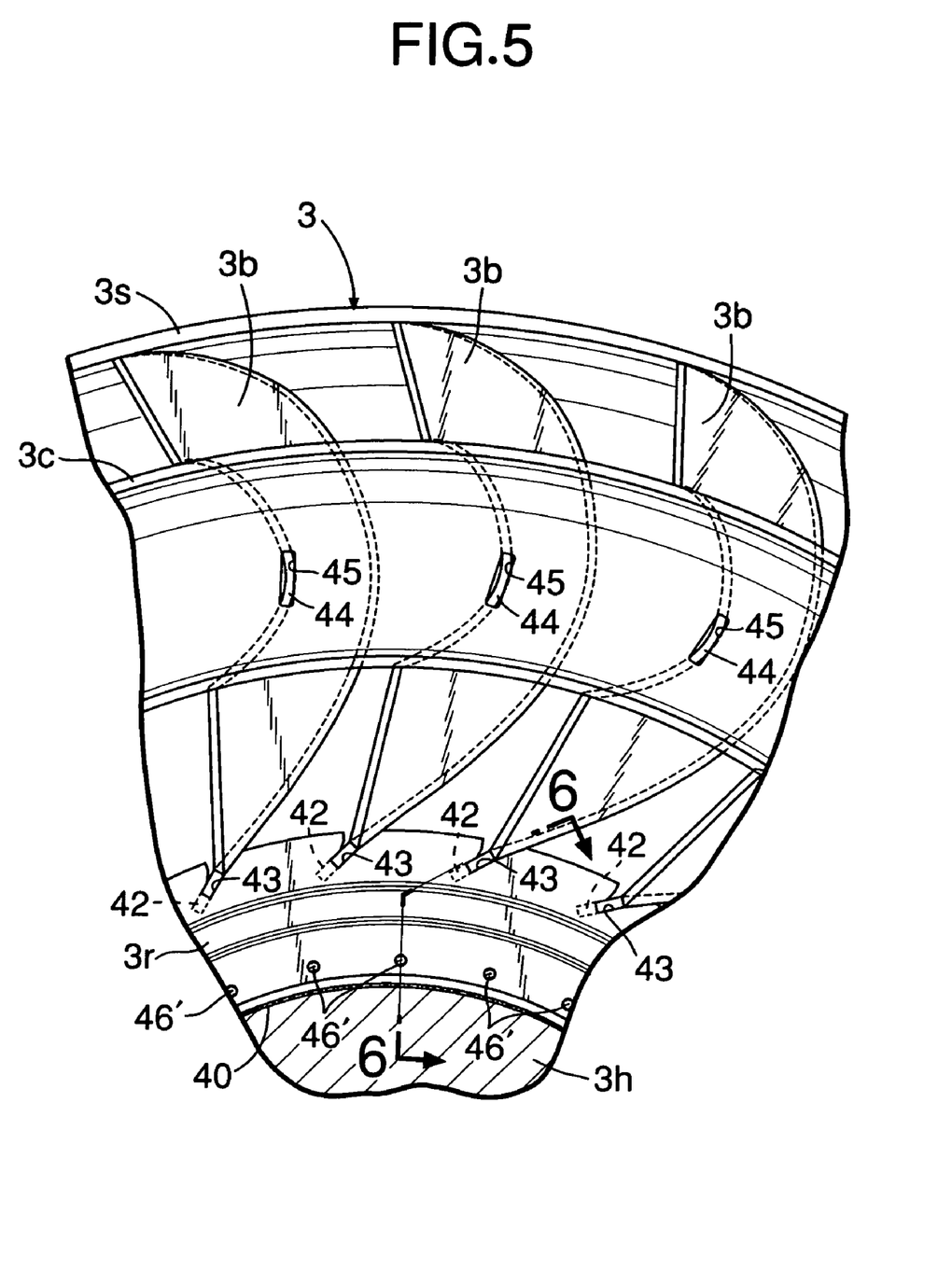
FIG. 5 is a sectional view taken on line 5-5 in FIG. 1.
Figure 6:
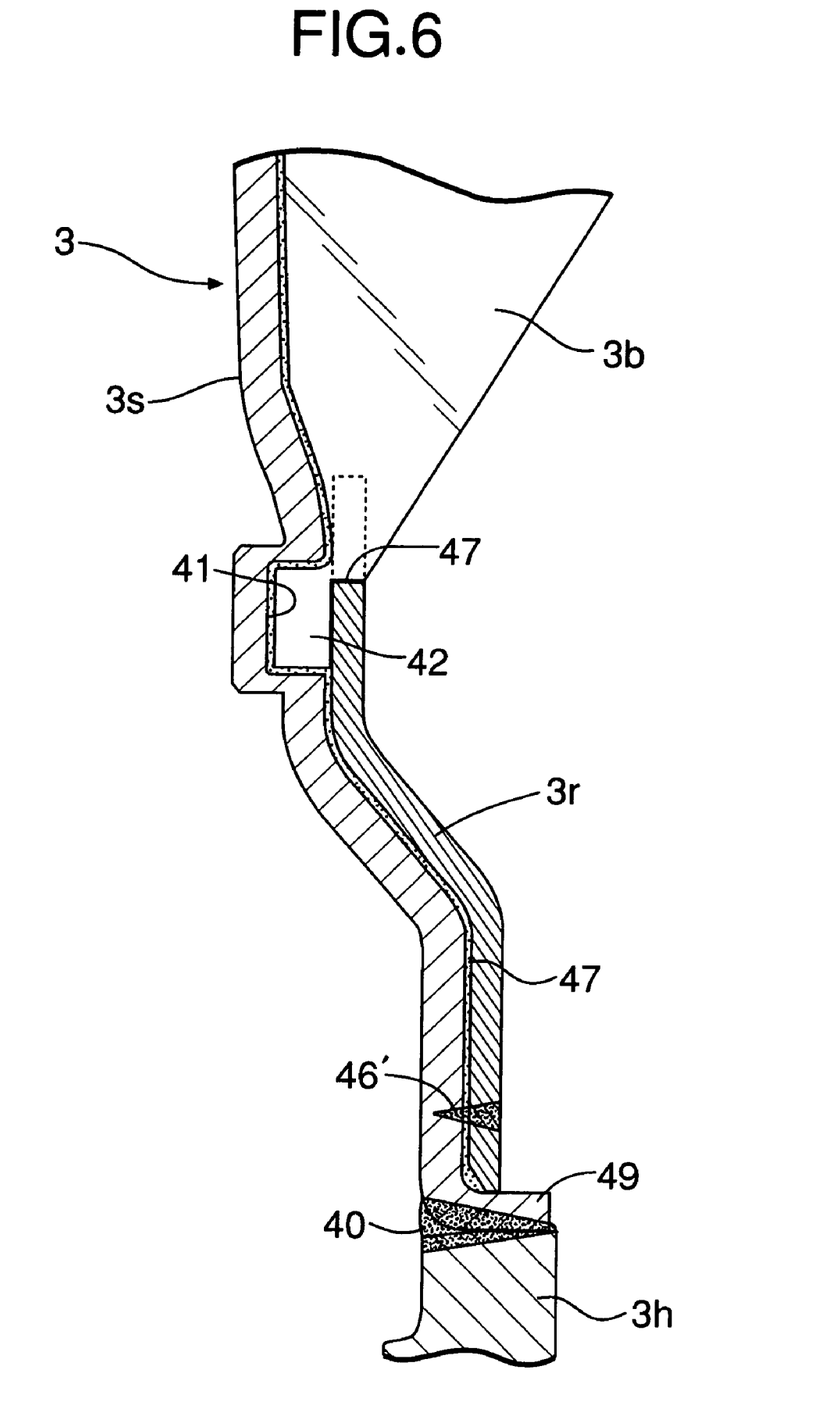
FIG. 6 is a sectional view taken on line 6-6 in FIG. 5.
Figure 7A:
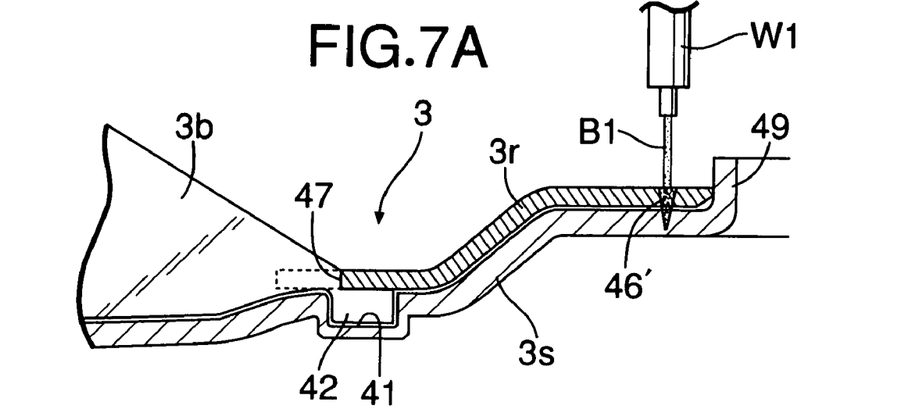
FIG. 7A illustrates a process of manufacturing a turbine impeller, including formation of plural weld seam spots.
Figure 7B:
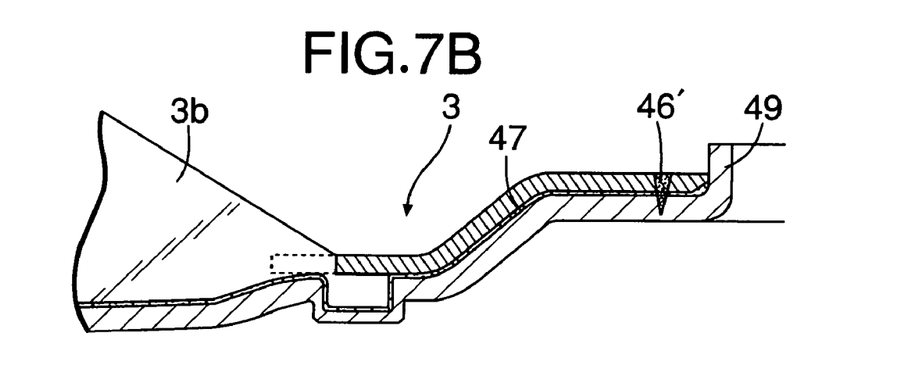
FIG. 7B illustrates a process of manufacturing a turbine impeller, including infiltration of a molten brazing material.
Figure 7C:
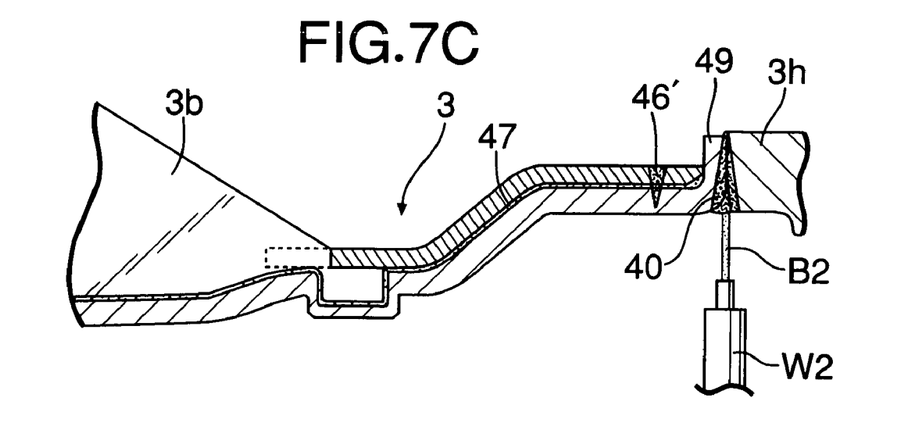
FIG. 7C illustrates a process of manufacturing, including formation of an annular weld seam.

Referring now to FIGS. 5 to 7, a construction of the turbine impeller 3 and a method of manufacturing the same will be described.

The turbine impeller 3 is similar in construction to the pump impeller 2 in that the turbine impeller 3 comprises: a bowl-shaped annular shell 3s; a number of blades 3b brazed in place on an inner surface of the shell 3s; a retainer plate 3r brazed to an inner surface of the shell 3s to retain radially inner ends of the blades 3b; a core 3c connecting intermediate portions of all the blades 3b to each other; and a hub 3h fitted to an inner peripheral surface of the shell 3s and bonded thereto through an annular weld seam 40 formed by laser welding. However, because the shell 3s is thin unlike the shell 2s of the pump impeller 2, a cylindrical boss 49 inwardly protruding in an axial direction of the turbine impeller 3 is molded beforehand so as to bend at the inner peripheral end in order to secure a sufficient fitting depth with respect to the hub 3h.

Because the positioning structure for the shell 3s, the blades 3b and the retainer plate 3r in the turbine impeller 3 is the same as that of the pump impeller 2, portions corresponding to those of the pump impeller 2 are designated by the same reference numerals and symbols in the drawings and the description of the positioning structure is omitted.

To braze the blades 3b and the retainer plate 3r to the shell 3s, the blades 3b and the retainer plate 3r are first set in place on the shell 3s, as shown in FIG. 7A, and then while the shell 3s and the retainer plate 3r are rotated around their axe, a laser beam B1 is applied by a laser welding torch W1 to the outer surface near the inner peripheral end of the retainer plate 3r, thereby forming plural weld seam spots 46' such that the weld seam spots 46' melt and extend from the outer surface of the retainer plate 3r into the wall of the shell 3s. By the plural weld seam spots 46', the retainer plate 3r is temporarily fixed to the shell 3s.

After the temporary fixation, as shown in FIG. 7B, a molten brazing material 47 is infiltrated between the shell 3s and blades 3b, as well as the retainer plate 3r to perform brazing. The blades 3b are thus firmly bonded to the shell 3s along with the retainer plate 3r.

In the process of this brazing, the molten brazing material 47 circumvents the weld seam spots 46' to reach an inner peripheral end of the retainer plate 3r between the shell 3s and the retainer plate 3r, so that the retainer plate 3r is brazed to the inner peripheral end, thereby increasing the brazing strength. Therefore, it is possible to reduce the thickness of the retainer plate 3r and accordingly its weight. In addition, the molten brazing material 47, which circumvents the weld seam spots 46' to reach an outer peripheral surface of the boss 49, could not climb over the outer peripheral surface of the boss 49, and thus does not reach an inner peripheral surface of the boss 49. Therefore, the weld seam spots 46' are sufficient to temporarily fix the retainer plate 3r, thereby improving the efficiency of the operation of temporary fixation.

Also in this case, in forming the weld seam spots 46' by laser welding, flat opposed surfaces of the shell 3s and the retainer plate 3r are only overlapped, it is possible to facilitate welding operation, and further avoid distortion in the shell and the retainer plate, thereby contributing to an improvement of the quality and productivity of an impeller. Further, because each weld seam spot 46' begins at the retainer plate 3r and terminates within the wall of the shell 3s, welding traces do not appear on the outer surface of the shell 3s, thereby provide a good appearance.

After the brazing, the boss 49 of the shell 3s is fitted to the outer peripheral surface of the hub 3h, then while the shell 3s, the retainer plate 3r and the hub 3h are rotated around their axe, a laser beam B2 is applied by a laser welding torch W2 from the outside of the shell 3s toward a fitted portion of the boss 49 and the hub 3h, thereby forming an annular weld seam 40 such that the weld seam 40 melts and extends from one axial end to the other end of the fitted portion, i.e. extends over the entire length of the fitting depth on the fitted portion as shown in FIG. 7C. With the annular weld seam 40, the shell 3s and the hub 3h are liquid-tightly and firmly bonded to the hub 2h.

As described above, the brazing material 47 bonding the retainer plate 3r to the shell 3s is blocked by an outer peripheral surface of the boss 49 of the shell 3s, and does not reach an inner peripheral surface of the boss 49, thereby reliably prevent the brazing material 47 from flowing out and mixing into the molten portion when the fitted portion is laser-welded. Therefore, also in this case, a good weld seam 40 is formed to enhance the bonding strength between the boss 49 of the shell 3s and the hub 3h.

Also, because the boss 49 of the shell 3s extends to secure a sufficient axial fitting depth with respect to the hub 3h, the depth of the weld seam 40 is large enough to enhance the bonding between the shell 3s and the hub 3h although the shell 3s is relatively thin.

Of course, also in the turbine impeller 3, a relatively small amount of heat input is required for forming the weld seam spots 46' and the annular weld seam 40 by laser welding, thereby avoiding thermal distortion in the shell 3s, and a process of removing the spatter is not required because the spatter does not occur. Therefore, the present invention can greatly contribute to an improvement of the quality and productivity of the turbine impeller 3.

In addition, the annular weld seam 40 is formed such that the weld seam 40 is melted by the laser beam B2 and extends from one axial end to the other end of the fitted portion of the boss of the shell 3s to the hub 3h, and thus also in this case, an annular discolored portion is created on the other end of the fitted portion, that is, an outer surface of the retainer plate 3r. Therefore, anyone can easily and reliably determine whether the laser weld is good or not only by a visual inspection as to the presence or absence of the discolored portion, thereby contributing to a guarantee of high quality.

Figure 9:
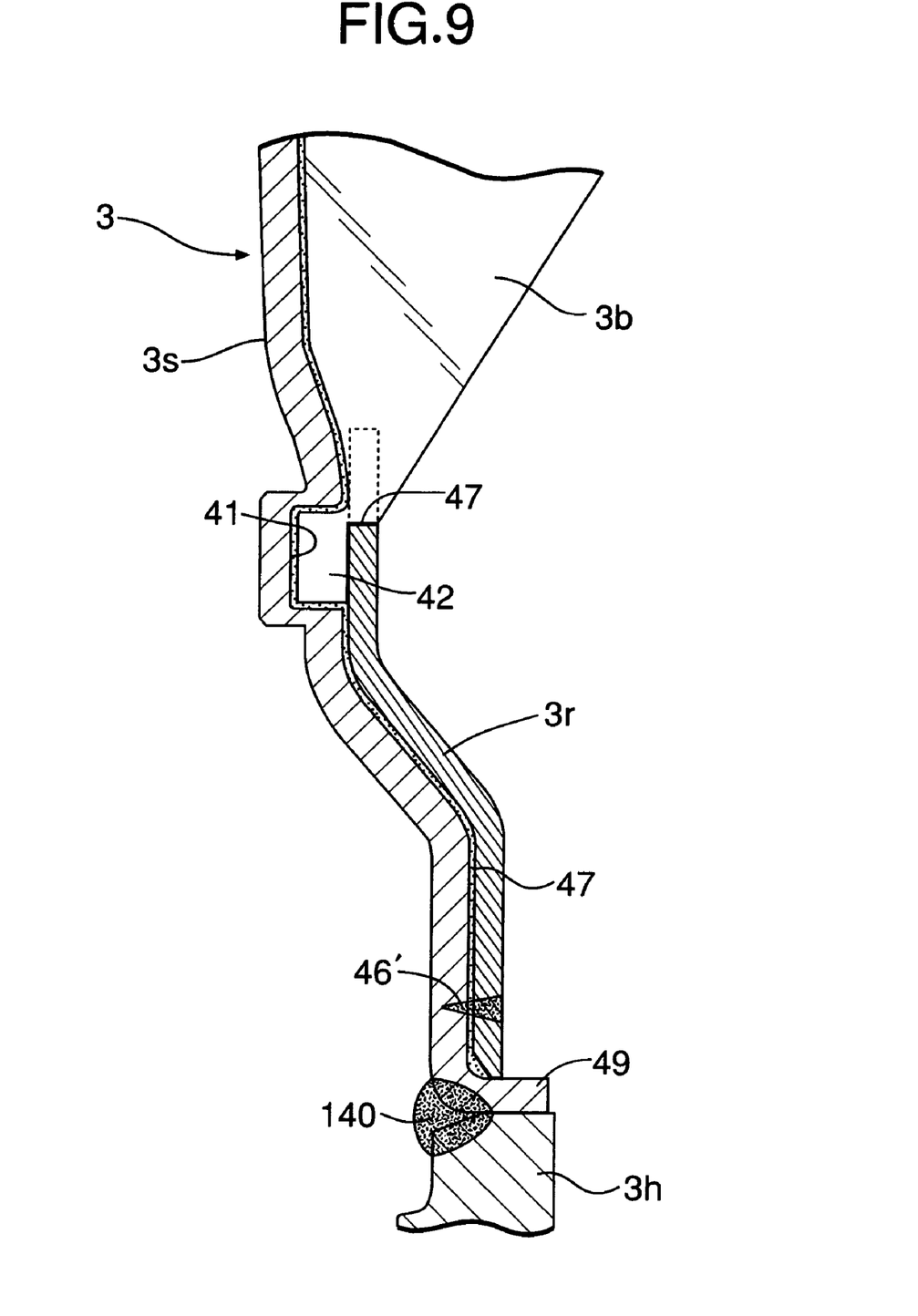
FIG. 9 illustrates a modification of the turbine impeller, corresponding to FIG. 6.

To bond the shell 3s to the hub 3h, an annular weld seam 140 may be formed by TIG or MIG welding, as shown in FIG. 9.

The present invention is not limited to the above embodiments, and various changes can be made in the design without departing from the subject matter thereof. The structure of the pump impeller 2 in the above embodiments may be applied to a turbine impeller, and the structure of the turbine impeller 3 in the above embodiments may be applied to a pump impeller. The invention is also applicable to a pump impeller and a turbine impeller for a fluid coupling.

What is claimed is:

1. An impeller for a fluid transmitting device, comprising:
   a hub;
   a bowl-shaped shell;
   a retainer plate connected to the shell via a first annular weld seam that begins at the retainer plate and terminates within a wall of the shell; and
   a plurality of blades extending from an inner peripheral surface of the shell and comprising radially inner ends retained by the retainer plate,
   wherein the shell and the retainer plate are connected to a peripheral surface of the hub by a second annular weld seam that extends through an entire axial depth of the shell and retainer.

2. An impeller for a fluid transmitting device, comprising:
   a hub;
   a bowl-shaped shell;
   a retainer plate connected to the shell via plural weld seam spots that begin at the retainer plate and terminate within a wall of the shell; and
   a plurality of blades extending from an inner peripheral surface of the shell and comprising radially inner ends retained by the retainer plate,
   wherein a cylindrical boss formed at an inner peripheral end of the shell is connected to a peripheral surface of the hub by a weld seam formed between the boss and hub by laser welding over an entire axial depth of the boss.

3. A method of manufacturing an impeller for a fluid transmitting device, comprising the steps of:
   arranging annularly a plurality of blades on an inner surface of a bowl-shaped shell;
   fixing temporarily by welding an annular retainer plate on the inner surface of the shell to retain radially inner ends of the blades,
   wherein the welding is performed by superposing the retainer plate on the inner surface of the shell, and forming a first annular weld seam that begins at the retainer plate and terminates within a wall of the shell by applying a laser beam from the side of the retainer plate;
   brazing the blades and the retainer plate to the inner surface of the shell; and
   welding a hub to a central portion of the shell and retainer plate with a second annular weld seam that extends an entire axial depth through the shell and retainer plate.

4. A method of manufacturing an impeller for a fluid transmitting device according to claim 3, wherein the first weld seam is annularly formed to surround the hub, and the blades and the retainer plate are brazed to the inner surface of the shell at a position radially outward of the first weld seam.

5. A method of manufacturing an impeller for a fluid transmitting device according to claim 3, wherein a cylindrical boss protruding toward the retainer plate is formed at a peripherally inner end of the shell, and wherein the first annular weld seam is formed in spots and the boss is connected to the hub by laser welding the second annular weld seam across the entire axial depth of the boss.

* * * * *